(12) United States Patent
Bergstedt

(10) Patent No.: US 8,286,931 B2
(45) Date of Patent: Oct. 16, 2012

(54) SUSPENSION ARRANGEMENT FOR DIRECTIONAL EQUIPMENT

(75) Inventor: Dan Bergstedt, Lidingö (SE)

(73) Assignee: Flir Systems AB, Danderyd (SE)

( * ) Notice: Subject to any disclaimer, the term of this patent is extended or adjusted under 35 U.S.C. 154(b) by 274 days.

(21) Appl. No.: 12/738,649

(22) PCT Filed: Oct. 1, 2008

(86) PCT No.: PCT/SE2008/000535
§ 371 (c)(1),
(2), (4) Date: Jul. 12, 2010

(87) PCT Pub. No.: WO2009/051535
PCT Pub. Date: Apr. 23, 2009

(65) Prior Publication Data
US 2010/0301189 A1 Dec. 2, 2010

(30) Foreign Application Priority Data
Oct. 17, 2007 (SE) ........................................ 0702318

(51) Int. Cl.
*F16M 1/00* (2006.01)
(52) U.S. Cl. ........................ 248/637; 248/550; 248/638
(58) Field of Classification Search .................. 248/637, 248/638, 550, 291.1, 292.12; 74/5 R, 5.22; 474/109, 111, 140; 396/428, 419
See application file for complete search history.

(56) References Cited

U.S. PATENT DOCUMENTS

| | | | |
|---|---|---|---|
| 4,779,833 A * | 10/1988 | Fletcher et al. | ............... 248/550 |
| 4,989,466 A | 2/1991 | Goodman | |
| 5,184,521 A | 2/1993 | Tyler | |
| 2004/0223062 A1 | 11/2004 | Pettegrew et al. | |
| 2005/0031335 A1* | 2/2005 | Itzkowitz | ...................... 396/419 |

FOREIGN PATENT DOCUMENTS
DE   102005048237 B3   3/2007

OTHER PUBLICATIONS
PCT/ISA/210—International Search Report—Jan. 22, 2009.
PT/ISA/237—Written Opinion of the International Searching Authority—Jan. 22, 2009.

* cited by examiner

*Primary Examiner* — Ramon Ramirez
(74) *Attorney, Agent, or Firm* — Venable LLP

(57) ABSTRACT

A suspension arrangement for directional equipment. The arrangement includes a body that supports the equipment and that supports a drive motor with a driving belt sheave, a driven belt sheave coupled to the directional equipment and a drive belt running between the belt sheaves. To prevent random or periodic movements in the mounting of the supporting body being transmitted to the equipment, a stabilizing unit including two guide rollers mounted at a fixed distance from one another on a displaceable holder, is designed to act via the guide rollers upon the belt in the space between the driving belt sheave and the driven belt sheave.

8 Claims, 2 Drawing Sheets

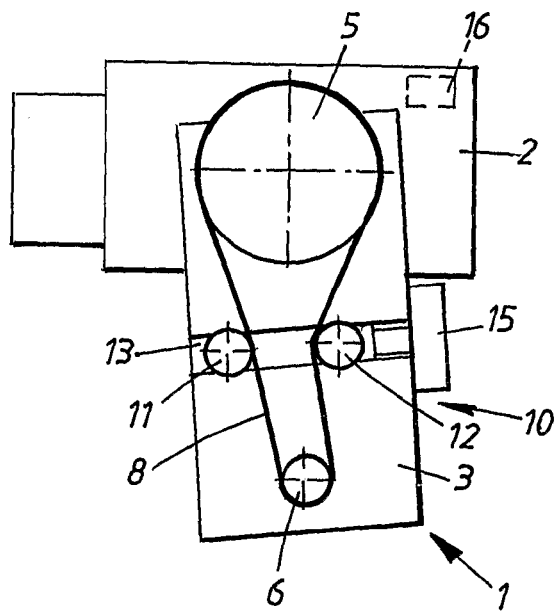
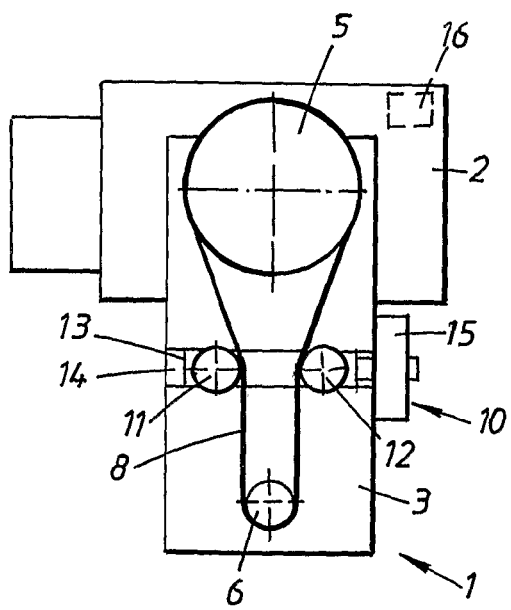
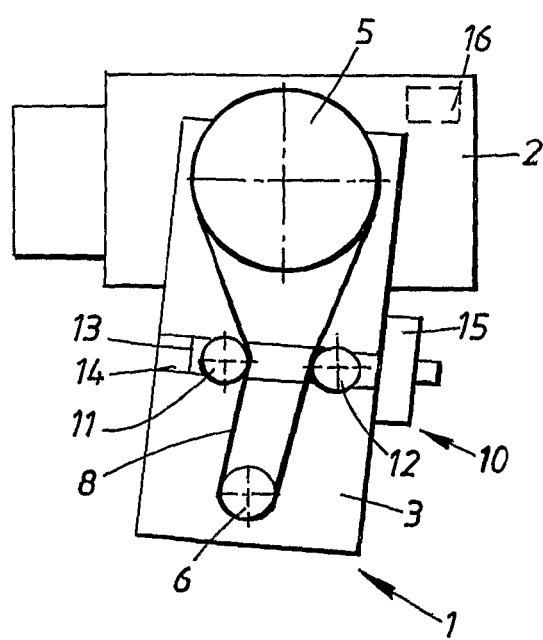

SUSPENSION ARRANGEMENT FOR DIRECTIONAL EQUIPMENT

CROSS-REFERENCE TO RELATED APPLICATIONS

This application claims priority to Swedish patent application number 0702318-7 filed 17 Oct. 2007 and is the nation phase under 37 C.F.R. §371 of PCT/SE2008/000535 filed 1 Oct. 2008.

FILED OF THE INVENTION

The present invention relates to a suspension arrangement for directional equipment, such as cameras, lasers or weapons, the arrangement comprising a body which supports the equipment and which supports a drive motor with a driving belt sheave, a driven belt sheave coupled to the directional equipment and a drive belt running between the belt sheaves.

BACKGROUND OF THE INVENTION

A suspension arrangement of this type was previously disclosed by the published patent application US 2004/0223062 A1, for example. The application shows a pan-tilt camera system comprising a driving belt sheave and a driven belt sheave, coupled together by a drive belt. According to the embodiment shown in FIG. 5, a further belt sheave is also included for adjusting the tension of the drive belt. However, the suspension arrangement disclosed by the application lacks separate equipment for stabilizing the directional equipment, that is to say in this case the camera, intended to prevent random or periodic movements in the mounting of the suspension arrangement being transmitted to the camera.

Solutions previously known to us for stabilizing directional equipment, but using another drive system, are briefly touched upon below. All of these known solutions used a gyro, which indicates changes of direction.

According to one known solution, the suspension arrangement is driven by electric motors via gearboxes. The servo feedback-coupled to the motors compensates for the change of direction. This solution is not self-compensating since the inherent moment of inertia of the motors in conjunction with the transmission gearing constitutes the dominant load in the compensating movement. This results in a small bandwidth for the stabilization and a high degree of wear.

According to another known solution the suspension arrangement is directly driven by a torque motor. The solution is self-stabilizing and has a wide bandwidth. Disadvantages are that the solution has a low adjusting moment, which results in a susceptibility to bearing friction and also external interference. The torque motor solution is furthermore costly.

Another known suspension arrangement is of a four-axis design or more specifically a biaxial gimbal having a small trimming range enclosed in an outer biaxial gimbal having a large trimming range. The solution is self-stabilizing and robust, and has a large bandwidth. Disadvantages of this solution are that it is bulky and expensive.

A further known solution is to stabilize a mirror in cameras or other optical instruments, for example. The stabilization can be made virtually self-stabilizing by means of a secondary mass. The solution has a large bandwidth. Possible problems may include distortion of the image when panning and the fact that the mirror is itself an environmentally sensitive component.

SUMMARY OF THE INVENTION

The object of the present invention is to provide a suspension arrangement for directional equipment with built-in stabilization, which at a favourable cost fulfils the stabilization requirements and avoids the aforementioned disadvantages and problems of known solutions. A robust suspension arrangement is provided, which affords a large bandwidth potential and good accuracy.

The object is achieved by a suspension arrangement characterized in that a stabilizing unit, comprising two guide rollers mounted at a fixed distance from one another on a displaceable holder, is designed to act via the guide rollers upon the belt in the space between the driving belt sheave and the driven belt sheave. Designing a stabilizing unit to interact with a belt coupling affords a design construction which is comparatively cost-effective, since it is of relatively simple construction and still fulfils the high working requirements.

According to a suitable embodiment a control member may here be designed to control the displacement of the displaceable holder. The control member suitably derives information for its control operation from a gyro arranged in the suspension arrangement. The control member preferably comprises a linear motor.

The displaceable holder is suitably mounted in the supporting body by means of a bearing arrangement.

In order to produce movement in two planes, according to one proposed embodiment the suspension arrangement may be duplicated for action in two perpendicular planes, such as a tilting plane and a panning plane.

BRIEF DESCRIPTION OF THE DRAWINGS

The invention will be described in more detail below with reference to drawings attached, in which:

FIGS. 2a-2c illustrate the stabilizing unit forming part of the invention in three different positions relative to the camera and the supporting body of the suspension arrangement, FIG. 2a showing a position displaced anticlockwise, FIG. 2b a neutral position and FIG. 2c a position displaced clockwise.

DETAILED DESCRIPTION OF EMBODIMENTS OF THE INVENTION

Figure 1:
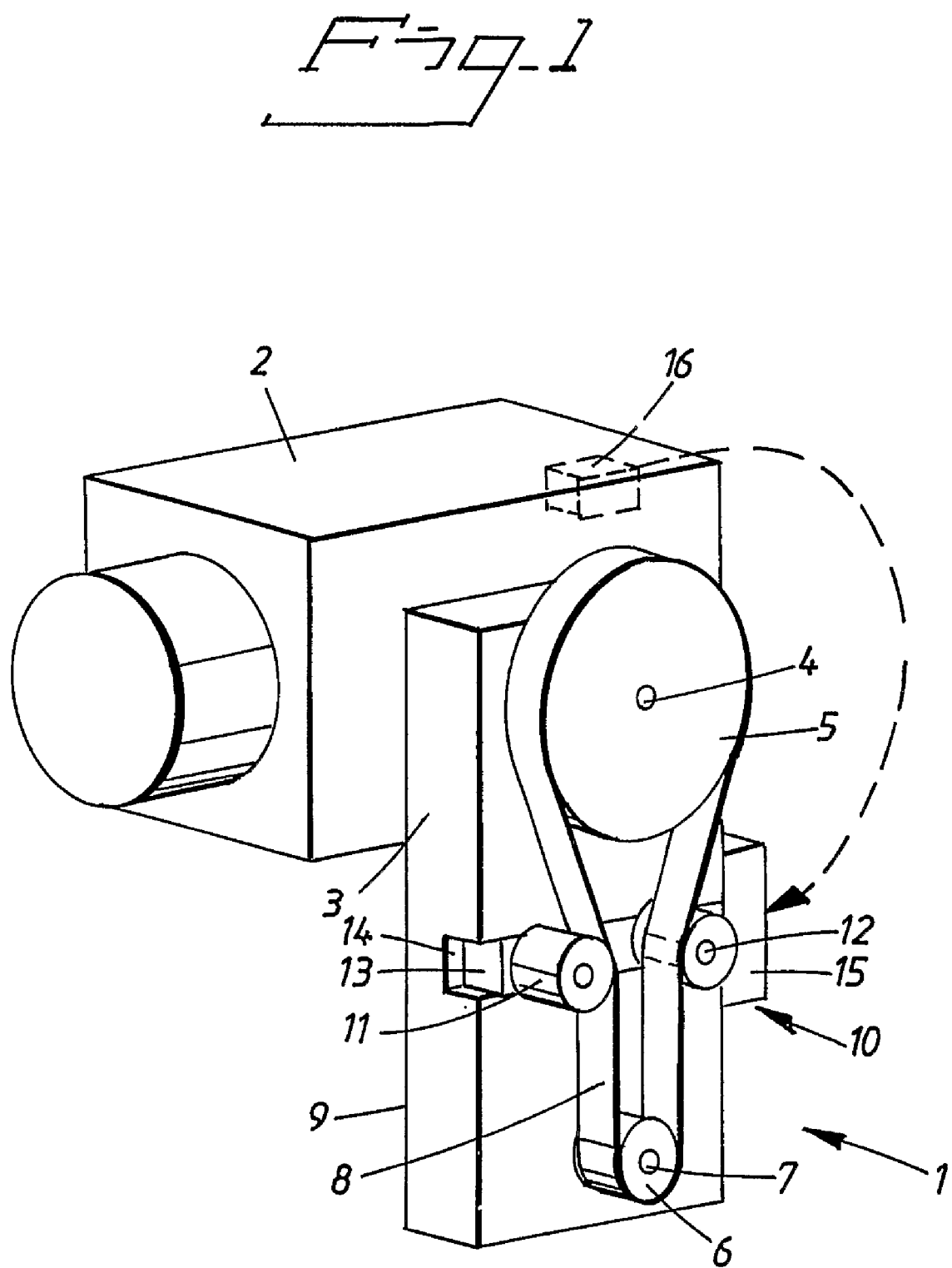
FIG. 1 shows a suspension arrangement according to the invention with a directional equipment in the form of a camera.

The suspension arrangement shown in FIG. 1, generally denoted by 1, supports a directional equipment in the form of a camera 2. Other examples of directional equipment are lasers and weapons. The examples cited do not preclude other equipment, which may require directional adjustment. The suspension arrangement 1 comprises a body 3, which supports the camera 2 via the axis 4 of a driven belt sheave 5. The axis 4 of the driven belt sheave 5 like the axis 7 of a constituent driving belt sheave 6 is rotatably supported in the body 3 by means of suitable bearings in the form of ball bearings or roller bearings, for example. A drive belt 8 is stretched around the driven belt sheave 5 and the driving belt sheave 6. The driving belt sheave 6 is coupled to a motor 9 via the axis 7.

A stabilizing unit 10 is arranged in the space between the driving belt sheave 6 and the driven belt sheave 7 respectively, in order to act upon the drive belt 8. The stabilizing unit 10 comprises two guide rollers 11, 12 mounted at a fixed distance from one another on a displaceable holder 13, which runs in a recess 14 in the body 3. In order to facilitate the displacement of the holder 13, a bearing arrangement (not shown) with slide, roller or ball bearings, for example, may be included. A control member 15 is designed to control the displacement of the displaceable holder 13. The control member is in contact with a gyro 16 arranged in the suspension arrangement. A linear motor is suitably included in the control member. The linear motor may in this case comprise a moving coil in a fixed magnetic field, for example.

Assuming that the axis 4 is the elevation axis of the suspension arrangement and that this passes through the centre of gravity of the camera 2, and that the mass of the stabilizing unit 10 is negligible, the arrangement is then in principle self-stabilizing, that is to say the camera strives to maintain its spatial orientation and the stabilizing unit moves laterally and compensates for small changes in the orientation of the body 3.

FIGS. 2a-2c show three different positions of the body 3, FIG. 2b being a neutral position, whilst FIG. 2a shows a position displaced anticlockwise and FIG. 2c a position displaced clockwise. According to FIG. 2a, compensation for the position displaced anticlockwise occurs in that the holder 13 together with the guide rollers 11, 12 has been displaced towards the left in relation to the body 3, whereas according to FIG. 2c compensation occurs in that the holder 13 together with the guide rollers 11, 12 has been displaced towards the right relative to the body 3. The camera has the same orientation in all three cases shown.

Introducing the control member 15 serves to compensate for friction in the bearings and for the mass of the stabilizing unit itself, which tends to impair the self-stabilization. The control member may furthermore be designed to positively reorient the camera at the command of a operator. The reorientation by means of the stabilizing unit 10 has a limited amplitude, however, for which reason a servo system is normally assumed to be included, which adjusts the driving belt sheave, as necessary.

The suspension arrangement has been described above in an embodiment which is closest to orientation in the elevation or "tilted" direction. However, the invention may equally well be applied in the "bearing direction" or the "panning direction". There is also nothing to prevent stabilization being arranged simultaneously in two perpendicular planes by duplicating the suspension arrangement in two planes at right angles.

The invention is not limited to the exemplary embodiment described above, but lends itself to modifications within the scope of the following patent claims.

The invention claimed is:

1. A suspension arrangement for directional equipment, the arrangement comprising:
   a body which supports the directional equipment and which supports a drive motor with a driving belt sheave, a driven belt sheave coupled to the directional equipment and a drive belt running between the belt sheaves, and
   a stabilizing unit comprising two guide rollers mounted at a fixed distance from one another on a displaceable holder is designed to act via the guide rollers upon the belt in the space between the driving belt sheave and the driven belt sheave.

2. The suspension arrangement according to claim 1, further comprising:
   a control member designed to control the displacement of the displaceable holder.

3. The suspension arrangement according to claim 2, wherein the control member derives information for its control operation from a gyro arranged in the suspension arrangement.

4. The suspension arrangement according to claim 2, wherein the control member comprises a linear motor.

5. The suspension arrangement according to claim 1, wherein the displaceable holder is arranged in the supporting body by a bearing arrangement.

6. The suspension arrangement according to claim 1, wherein the suspension arrangement is duplicated for action in two perpendicular planes.

7. The suspension arrangement according to claim 6, wherein the two perpendicular planes comprise a tilting plane and a panning plane.

8. The suspension arrangement according to claim 1, wherein the directional equipment comprises cameras, lasers or weapons.

* * * * *